United States Patent [19]

Mueller

[11] Patent Number: 5,638,866

[45] Date of Patent: Jun. 17, 1997

[54] DETENT ARRANGEMENT FOR HOLDING HYDRAULIC VALVE MEMBERS STROKED

[75] Inventor: Michael Allen Mueller, Circle Pines, Minn.

[73] Assignee: Dana Corporation, Toledo, Ohio

[21] Appl. No.: 609,734

[22] Filed: Mar. 1, 1996

[51] Int. Cl.$^6$ .............. F15B 13/04; F16K 11/18; F16K 31/06

[52] U.S. Cl. .......... 137/636.2; 91/465; 137/596; 137/625.6; 137/625.68; 251/65; 251/297

[58] Field of Search .............. 137/596, 596.1, 137/625.6, 625.68, 636, 363.2, 868; 251/65, 297; 74/527, 529, 531; 91/465

[56] References Cited

U.S. PATENT DOCUMENTS

| | | | |
|---|---|---|---|
| 2,836,194 | 5/1958 | Tjaden | 137/599.2 |
| 2,958,233 | 11/1960 | Johnson | 137/636.2 |
| 3,490,495 | 1/1970 | Green | 137/636.1 |
| 3,528,638 | 9/1970 | Finley et al. | 251/73 |
| 3,667,723 | 6/1972 | Schneider | 251/68 |
| 3,698,415 | 10/1972 | Forster et al. | 137/102 |
| 3,766,944 | 10/1973 | Distler | 137/636.2 |
| 4,184,512 | 1/1980 | Piqnolet | 137/596 |
| 4,195,551 | 4/1980 | Schmiel | 251/68 |
| 4,296,773 | 10/1981 | Harshman et al. | 137/312 |
| 4,342,335 | 8/1982 | Reinicker et al. | 251/297 |
| 4,777,981 | 10/1988 | Petro | 137/636.2 |
| 4,827,982 | 5/1989 | Inagaki | 137/636.1 |

FOREIGN PATENT DOCUMENTS

| | | |
|---|---|---|
| 1345091 | 4/1902 | France . |
| 2236101 | 1/1975 | France . |
| 1494400 | 12/1977 | United Kingdom . |
| 1524641 | 9/1978 | United Kingdom . |
| 1549195 | 7/1979 | United Kingdom . |

*Primary Examiner*—George L. Walton
*Attorney, Agent, or Firm*—Millen, White, Zelano & Branigan, P.C.

[57] ABSTRACT

A hydraulic pilot valve has a joystick which is normally maintained in a neutral position by coil springs acting on plungers which engage corresponding first cam surfaces of a cam fixed to the joystick. The plungers are each connected to respective valve members which are stroked to open the pilot valve when the plungers are depressed. When the joystick is pivoted to depress one of the plungers so as to stroke one of the valve members, that valve member is held stroked by an magnetic detent. The joystick may then be released and the valve member will remain in its stroked position. When the joystick is moved back towards a neutral position, a second cam surface on the joystick engages an outer end portion of the depressed plunger and applies an axial force to the plunger. This disengages an armature component of the magnetic detent from an electromagnetic component. A spring then pushes the plunger to its neutral position where the plunger holds the valve member operated thereby closed. In accordance with one embodiment, one joystick operates two or more valve members and, in accordance with another embodiment, the pilot valves are stacked.

19 Claims, 7 Drawing Sheets

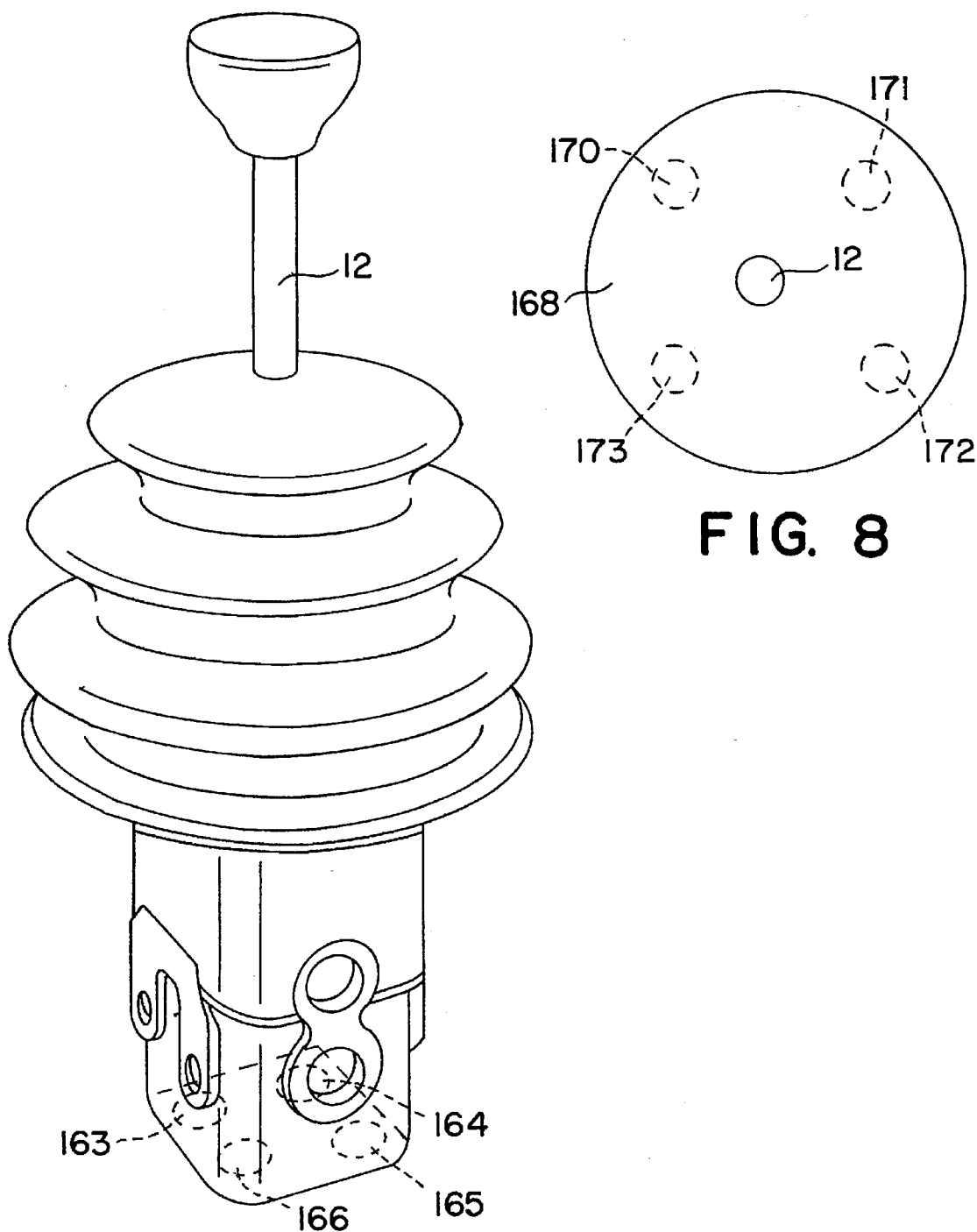

ns its stroked position from its neutral position.

DETENT ARRANGEMENT FOR HOLDING HYDRAULIC VALVE MEMBERS STROKED

FIELD OF THE INVENTION

The present invention relates to a detent arrangement for holding hydraulic valve members stroked. More particularly, the present invention relates to hydraulic controllers which utilize magnetic detents to hold hydraulic valve members stroked.

BACKGROUND OF THE INVENTION

Joystick controllers for remotely controlled valves are in wide use. It is the current practice to utilize magnetic detents to retain a joystick in its stroked position when the joystick is moved from a neutral position to an operative position. Typically, the controllers are pilot valves each having two to four work ports with a joystick normally in a neutral position. When the joystick is in the neutral position, the work ports are open to the exhaust port. The joystick is moveable to numerous stroked positions to open or detent one or more of the work ports. Exemplary of such devices is the hydraulic valve detent mechanism of U.S. Pat. No. 4,342,335.

In the hydraulic valve detent mechanism of U.S. Pat. No. 4,342,335, plungers which operate valve members have outer ends which must remain in contact with an operating cam on the joystick at all times. This causes wear between the outer ends of the plungers and the cam which operates the plungers. By having the plungers in continuous engagement with the cam, considerable clearance is needed for operation of the cam. Consequently, the cam must be relatively large. The larger the cam, the more the cam moves away from the pivot point, necessitating more clearance to ensure operation. Since in U.S. Pat. No. 4,342,335 it is necessary to utilize the force exerted by one plunger to keep the other plunger stroked, the force exerted by the unstroked plunger on the operating cam is about two to four times the force exerted by an individual plunger when the cam is in the neutral position. This excess force creates additional friction and the additional friction results in an increase in the force necessary to move the joystick. On occasion, the frictional forces may be so high that the joystick is prevented from returning to its neutral position from its stroked position.

SUMMARY OF THE INVENTION

In view of the aforementioned considerations, it is a feature of the present invention to provide a new and improved detent mechanism for joysticks used with hydraulic valves wherein frictional forces are reduced to provide a lighter touch and to reduce wear while maintaining a minimal footprint.

The present invention is directed to a joystick operated hydraulic valve having a casing with at least first and second work ports; at least first and second valve members disposed to open and close the respective first and second work ports; and at least first and second operating plungers each having outer ends and being biased to a neutral position within the casing. The first and second operating plungers are engageable with the first and second valve members. At least one joystick is pivotally mounted on the casing and operably engages the outer ends of the operating plungers to allow pivotal movement of the joystick in one direction to cause one of the operating plungers to move inwardly toward from a neutral position a depressed position in order to stroke the respective valve member while the other operating plunger remains in the neutral position. In accordance with the present invention, the improvement comprises at least first and second detents within the casing for latching against axial movement the first and second plungers, respectively. Each of the detents have first components which are stationary with respect to the first and second plungers and second components which are fixed to the first and second plungers. The second components are disposed between the outer ends of the plungers and the first components and act to hold the respective operating plunger depressed and the valve members stroked. First cam surfaces on the joystick engage the outer ends of the first and second plungers. The first cam surfaces depress the first plunger to stroke the first valve member upon pivoting the joystick in a first direction and depress the second plunger to stroke the second valve member upon pivoting the joystick in a second direction. Second cam surfaces on the joystick engage the outer ends of the plungers when the plungers are depressed to pull the plungers and to thereby disengage the first and second components of the detents from one another to unstroke the valve.

In accordance with another aspect of the invention, a single joystick strokes more than two and preferably four valve members and in accordance with still another aspect of the invention, hydraulic valves are stacked side-by-side with each valve having a separate joystick.

BRIEF DESCRIPTION OF THE DRAWINGS

Various other features and attendant advantages of the present invention will be more fully appreciated as the same becomes better understood when considered in conjunction with the accompanying drawing, in which like reference characters designate the same or similar parts throughout the several views, and wherein:

FIG. 7 is a perspective view showing a four work port pilot valve operated by a single joystick; and FIG. 8 is a top view showing a cam for operating four valves of the four work port pilot valves with the single joystick of FIG. 7.

DETAILED DESCRIPTION

Figure 1:
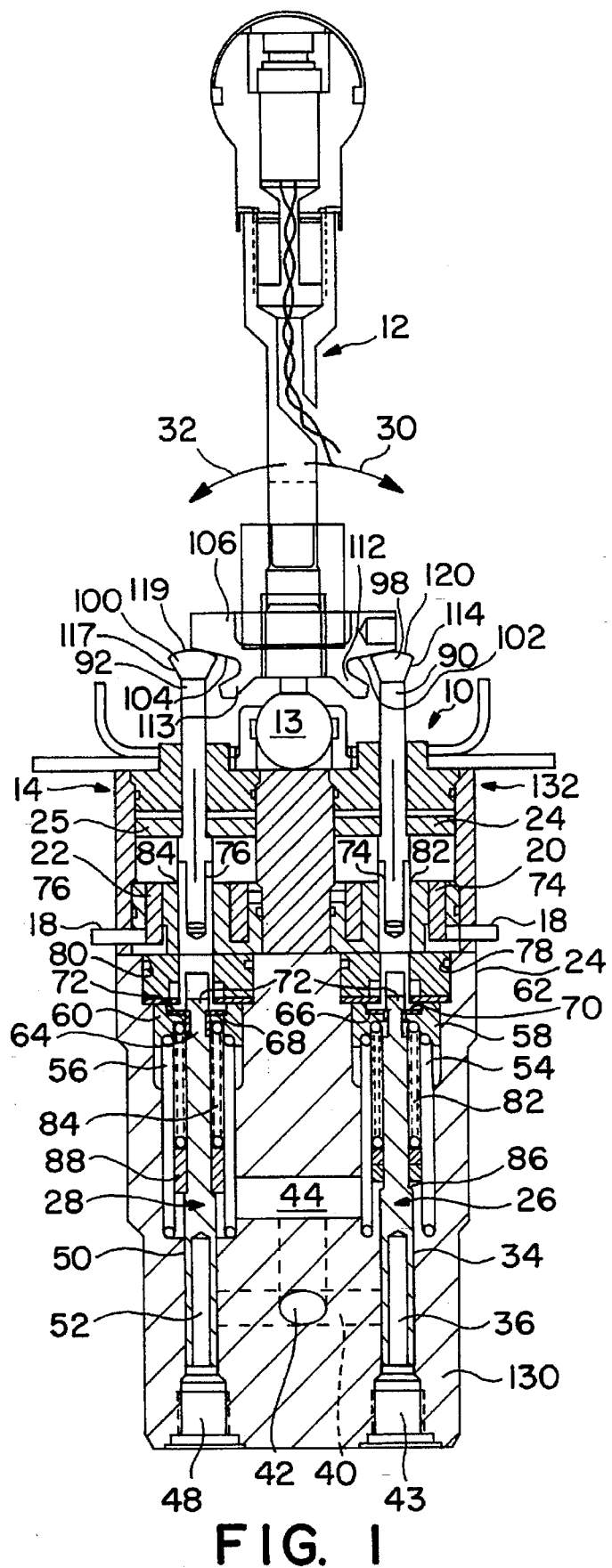
FIG. 1 is a side elevation, with parts broken away, of a hydraulic pilot valve configured in accordance with the features of the present invention showing a joystick in a neutral position.
Figure 2:
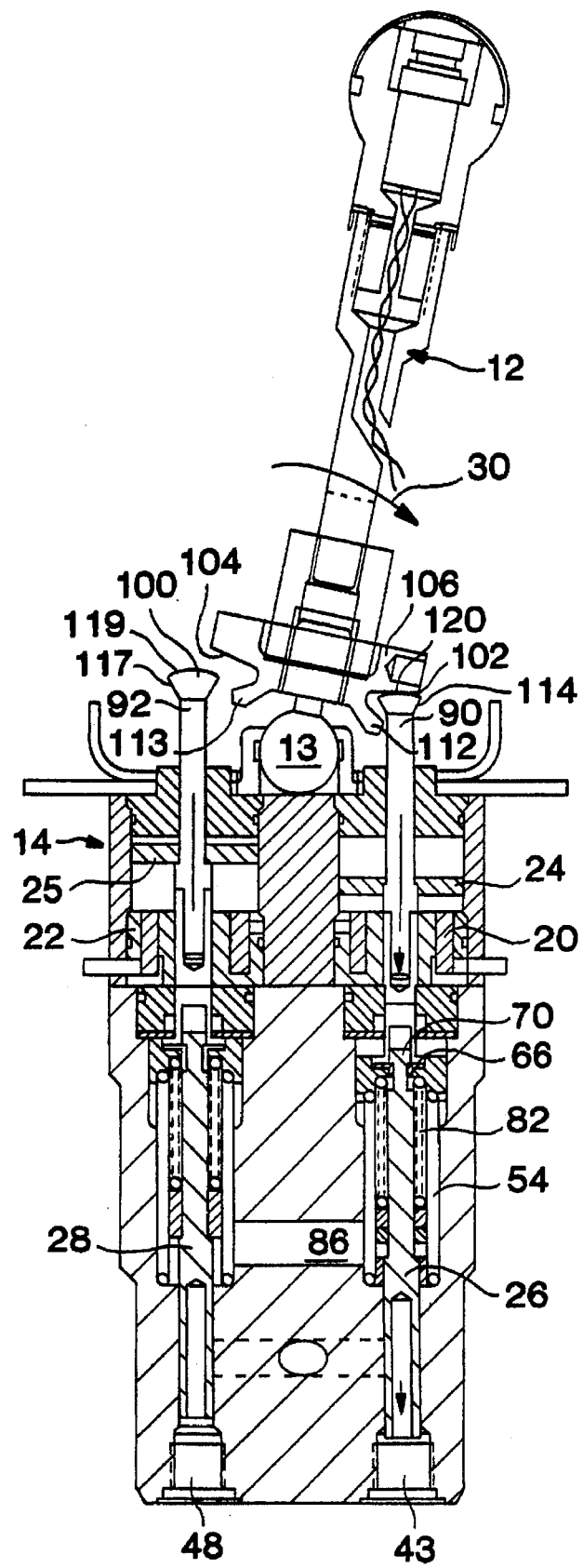
FIG. 2 is a view similar to FIG. 1, but showing the joystick stroking a valve member.
Figure 3:
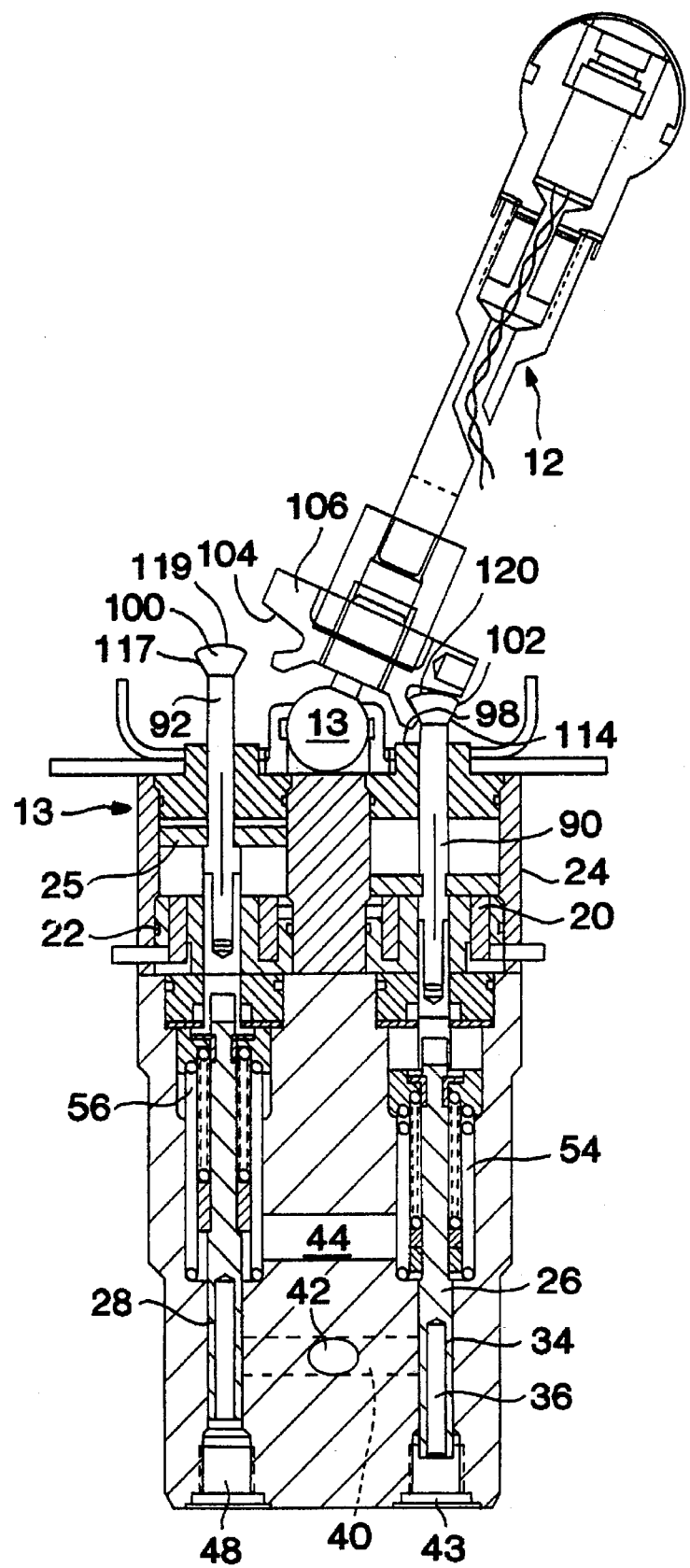
FIG. 3 is a view similar to FIGS. 1 and 2, but showing the valve member fully stroked and the joystick retained in a first detented position.

Referring now to FIGS. 1-4, there is shown a pilot valve 10 configured in accordance with the principles of the present invention, wherein the pilot valve includes a joystick 12 pivoted by a ball and socket 13 on a valve casing 14. Electromagnets 20 and 22 positioned in the casing 14 are aligned with armatures 24 and 25, respectively which engage the electromagnets to hold respective valve members 26 and 28 in the stroked position, as is illustrated in FIG. 3.

The valve members 26 and 28 are shown in an unstroked position in FIG. 1 with the joystick 12 in the neutral position. The joystick 12 can move in the direction of arrow 30 to stroke the valve member 26 and in the direction of arrow 32 to stroke the valve 28. When the valve member 26 is stroked, an inlet port 34 therein aligned with a central bore 36, moves into communication with an inlet passage 40 connected to an inlet port 42. Consequently, hydraulic fluid flowing into the inlet port 42 flows through the central bore 36 of the valve member 26 and out of a first work port 43. When the valve member 26 is in the unstroked position of FIG. 1, the passage 34 therethrough is out of alignment with the passage 40 so that flow through the inlet port 42 is precluded and fluid flowing into the first work port 43 is exhausted into an exhaust passage 44 and back to tank (not shown). Likewise, the second work port 48 is connected by the valve member 28 through ports 50 which communicate with a central bore 52 in the second valve member 28. In the FIG. 1 position, the ports 50 in the second valve member 28 are also open to tank. When the second valve member is stroked, port 50 allows hydraulic fluid to flow out of the second work port 48 and into tank 44.

The valve members 26 and 28 are biased to their unstroked positions by first springs 54 and 56 that engage couplings 58 and 60, respectively. The couplings 58 and 60 include circular recesses 62 and 64, respectively, and washers 66 and 68, respectively aligned with the circular recesses. The washers 66 and 68 retain end lugs 70 and 72 on the valve members 26 and 28 in a lost motion relationship with the couplings 58 and 60. The couplings 58 and 60 have stems 74 and 76, respectively which extend upwardly therefrom through annular guide blocks 78 and 80 and central apertures 82 and 84 in the electromagnets 20 and 22. Extending between the couplings 58 and 60 are second springs 82 and 84 which abut shoulders 86 and 88 on the valve members 26 and 28 to meter the flow to the work ports 43 and 48. Consequently, when the couplings 58 and 60 move downwardly against the bias of first springs 54 and 56, the second springs 82 and 84 urge the valve members 26 and 28 toward the stroked position of FIG. 3.

The couplings 58 and 60 are connected to the joystick 12 by plungers 90 and 92, respectively which seat within bores 94 and 96 in the coupling stems 74 and 76. Plunger 90 has a head 98 while the plunger 92 has a head 100. The heads 98 and 100 are urged upwardly by the first springs 54 and 56 to a valve closed or unstroked position. The head 98 engages a first cam surface 102 while the head 100 engages a second cam surface 104 of a cam 106 which is fixed to the joystick 12. As is seen in FIG. 1, the armatures 24 and 25 are fixed to the plungers 90 and 92 and are held in spaced relation to the electromagnets 20 and 22 when the joystick 12 is in the neutral position.

Referring now to FIG. 2, it is seen that the joystick 12 is rotating in the direction of arrow 30 about the ball joint 13 so as to depress the plunger 90 and to stroke the first valve member 26 against the bias of the first spring 54. Since the operation of the second valve member 28 is identical to the operation of the first valve member 26, rotation of the joystick 12 in the opposite direction of arrow 32 (see FIG. 1) strokes the second valve member 28 in an identical fashion. Accordingly, only rotation of the joystick 12 in the direction of arrow 30 as is shown in FIG. 2 is discussed.

As is seen in FIG. 2, a first cam surface 102 on the earn 106 is earning down the plunger 90 and moving the armature 24 toward the energized electromagnet 20. While this is happening, the second coil spring 82 is pushing against the shoulder 86 of the first valve member 26 to urge the first valve member downwardly and to meter the flow of fluid out of passage 40, through passage 34, through central bore 36, and out to the work port 43.

Referring now to FIG. 3, it is seen that the armature 24 is engaged with the electromagnet 20 to hold the plunger 90 in the depressed condition which in turn holds first valve member 26 stroked so that the port 34 therein which is aligned with the bore 36 is in communication with passage 40 in the valve body. Hydraulic fluid will then freely flow from the inlet 42 through the passage 40 and out through the first work port 43. When the joystick 12 is in the position of FIG. 3, the operator may release the handle of the joystick and the joystick will remain in the FIG. 3 position because the electromagnet 20 is magnetically retaining the iron armature 24 which is fixed on the plunger 90. Note that the cam surface 104 is now displaced from the head 100 of the stem 92 so that the only pressure against the cam 106 is the pressure applied by the first coil spring 54.

Figure 4:
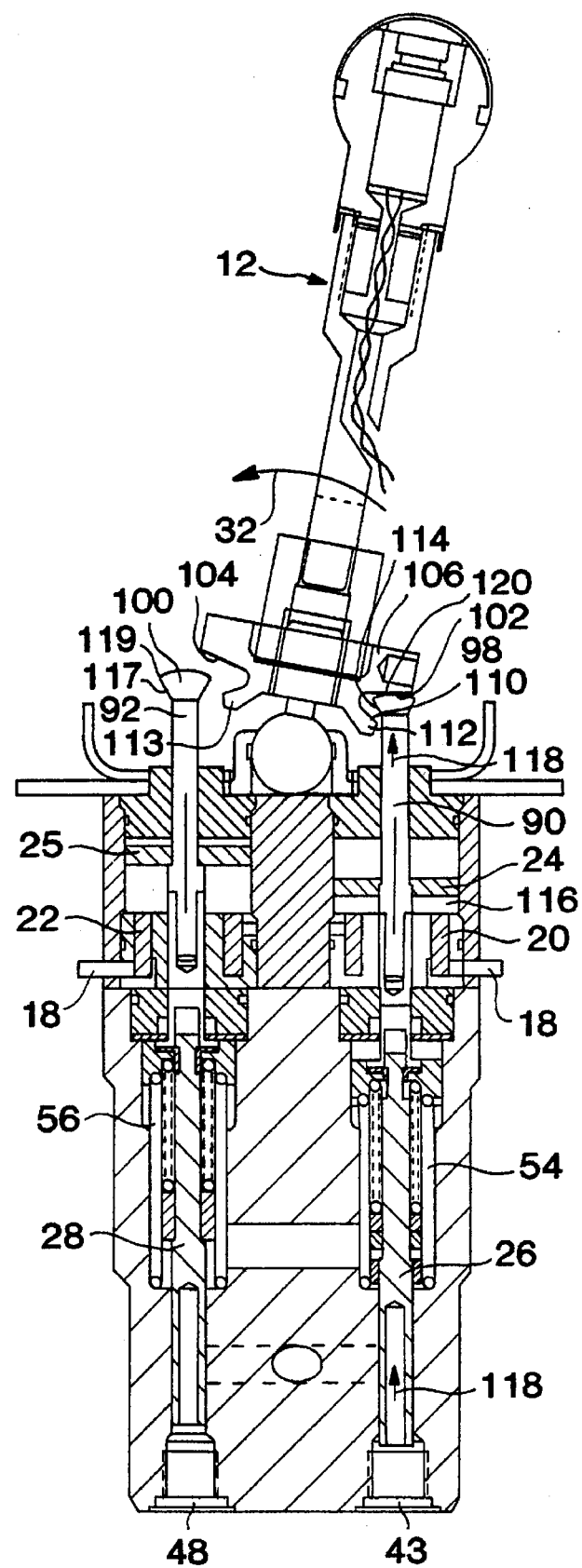
FIG. 4 is a view similar to FIGS. 1-3, but showing the valve member undetented and moving back toward the neutral position of FIG. 1.

Referring now to FIG. 4, when the joystick 12 is pivoted back toward the neutral position of FIG. 1, a second cam surface 110 on a lug 112 of the cam 106 engages a frustoconical surface 114 or other surface on the head 98 of the plunger 90 to apply a positive force to the plunger so as to mechanically disengage the armature 24 from the electromagnet 20. A lug 113 opposite the cam surface 104 operates in an identical manner to the lug 112 opposite the cam 102. Once a gap 116 occurs between the armature 24 and the electromagnet 20, the first spring 54 pushes the plunger 90 upwardly in the direction of arrows 118 which pulls the first valve member 26 upwardly back toward the neutral position of FIG. 1. When the joystick 12 returns to the FIG. 1 position, the cam 106 has again positioned the first cam surface 104 thereof in engagement with the head 100 while the second cam surface 102 is in engagement with the head 98. The first coil springs 54 and 56 then retain the joystick in its neutral position by acting against the cam surfaces 102 and 104. If it is desired that the joystick 12 not have any play, then it is important that the outer ends 100 and 98 both engage respective surfaces 102 and 104, but if slight play in the joystick 12 is desirable or unimportant, then the outer ends need not always engage the surfaces 102 and 104 when the joystick 12 is in the neutral position. The head 100 also has a frustoconical surface, other surface 117, which faces away from the outer end surface 119 of the plunger 92. The frustoconical surface 117 is engaged by the second cam surface 113 so as to unstroke the valve 28 in the same way that the valve 26 is unstroked by the lug 112 engaging the frustoconical surface 114. After the valve 28 is unstroked and it is decided to stroke the valve 26, the end surface 120 of the plunger 90 is engaged by the cam surface 102 so as to push the valve 26 downwardly.

With the arrangement of FIGS. 1-4, only two first springs 54 and 56 are needed because the lugs 112 and 113 engage the outer ends 98 and 100 of the plungers 90 and 92 to pull the plungers from the depressed position of FIG. 3 so as to break contact between the armatures 24 and 26 and the electromagnets 20 and 22. In the prior art arrangement of FIG. 5, when one moves the joystick 124 from a stroked position to an unstroked position, the cam 126 corresponding to the cam 106 of FIGS. 1-4 must work against the spring 120 or 122 of the undepressed plunger. Thus, there is an additional friction force to overcome. This results in a heavier touch for the joystick 124 as compared to the joystick 12. In addition, the prior art arrangement of FIG. 5 utilizes additional springs 120 and 122 in its operation so that three springs rather than two springs are required.

Figure 5:
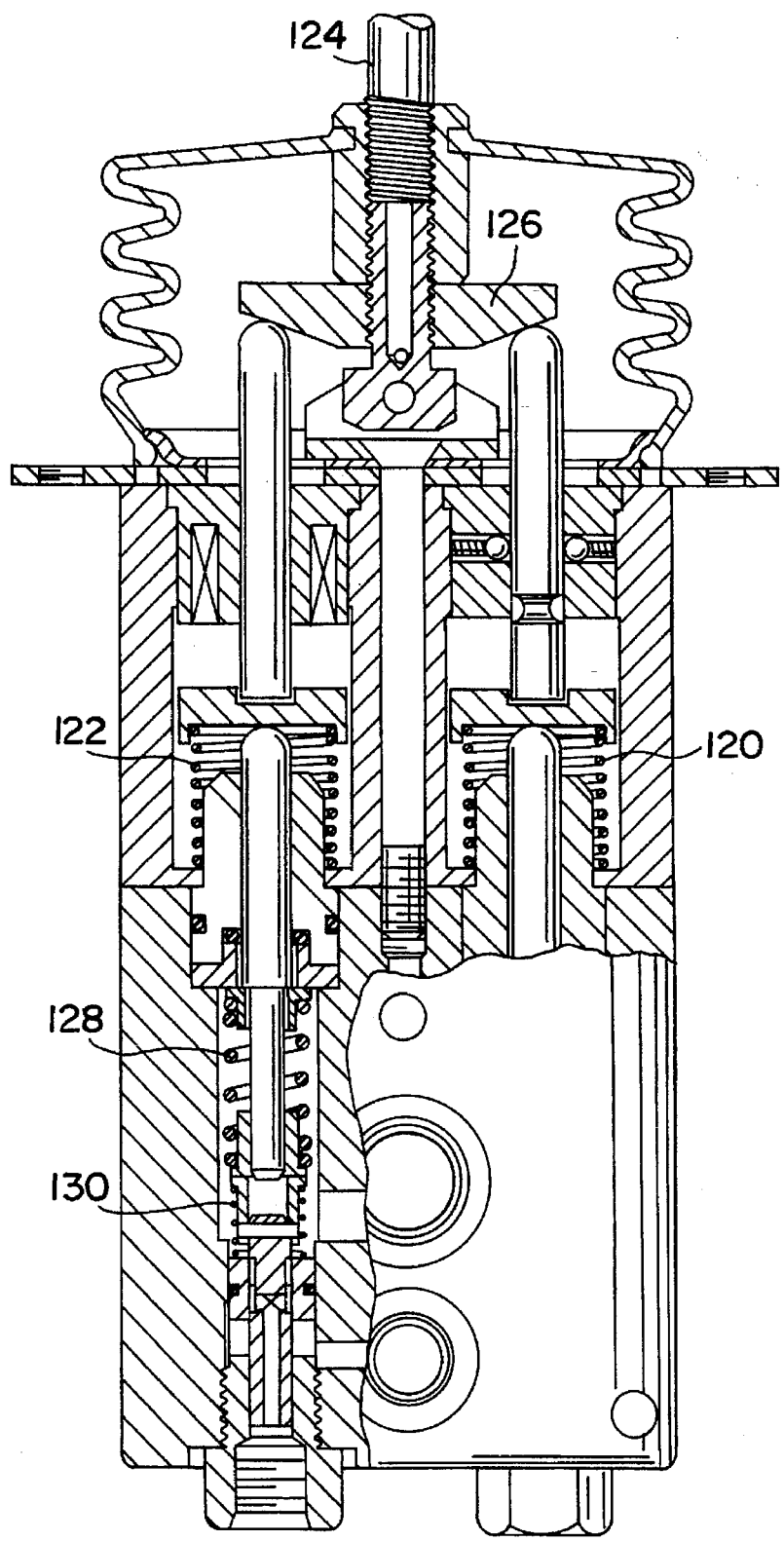
FIG. 5 is a view similar to FIGS. 1-4, but showing a prior art configuration of a pilot valve over which the present invention is an improvement.

Since the electromagnets 20 and 22 of FIGS. 1–4 are within the easing 14 of the hydraulic pilot valve 10, the hydraulic pilot valve 10 of the present invention has a footprint which is no greater than the footprint of the prior art hydraulic pilot valve of FIG. 5. Since the seals 78 in the guide blocks and 80 prevent leakage of hydraulic fluid from a lower portion 130 of the casing 14 to an upper portion 132 of the casing, the electromagnets 20 and 22 may be deleted from the casing 14 or added to the casing depending on the application with which the pilot valve 10 is used.

Figure 6:
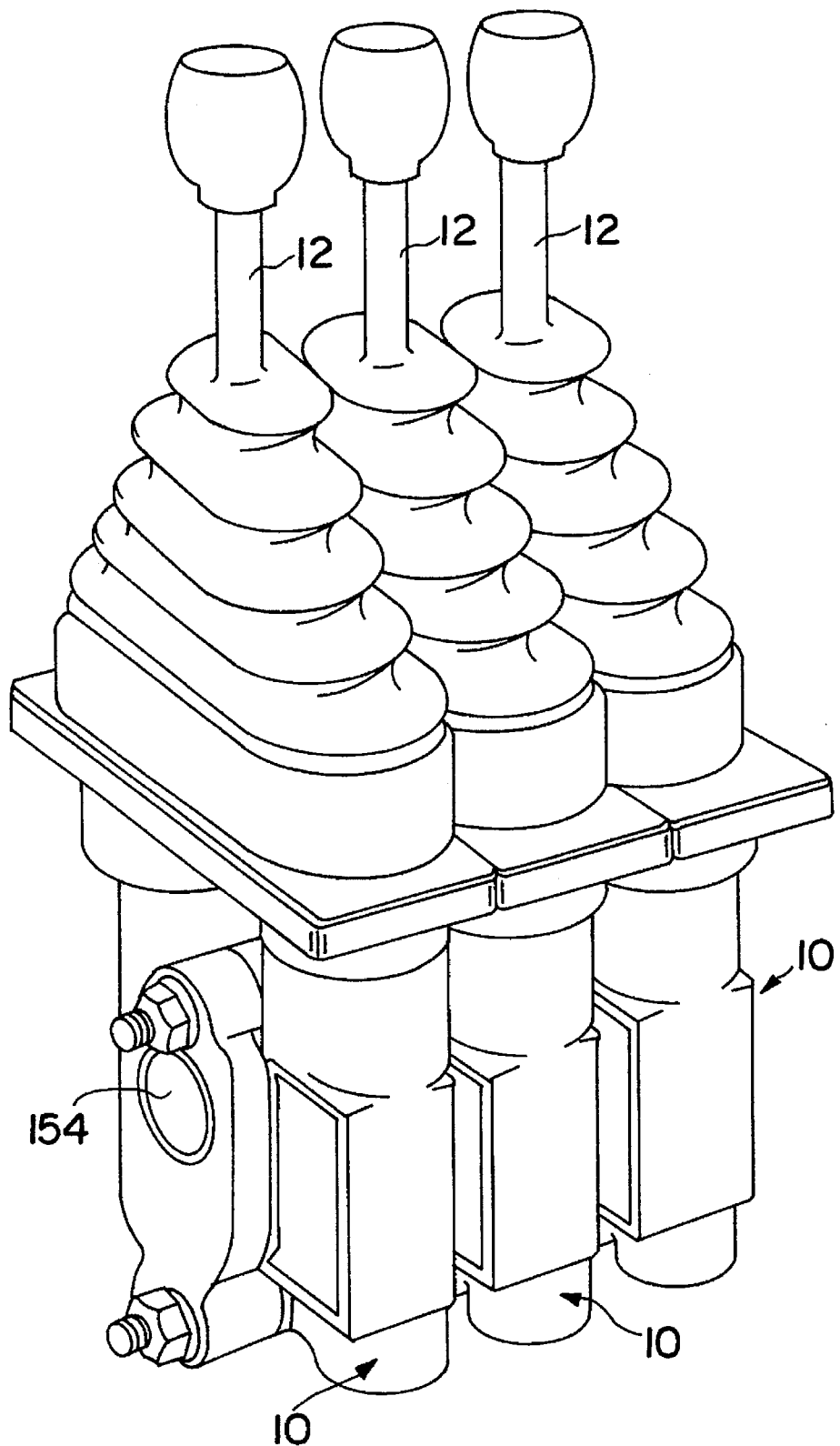
FIG. 6 is a perspective view showing a stack of hydraulic pilot valves with three of the valves shown in FIGS. 1-5 positioned side-by-side.

Referring now to FIG. 6, there is shown a second embodiment of the invention wherein a plurality of hydraulic pilot valves 10, each with a separate joystick 12, are attached side-by-side in a stacked pilot valve assembly 150. The stacked pilot valve assembly 150 has a common exhaust port 154 which connects to each of the exhaust ports 44 (see FIGS. 1–4) of the pilot valves 10 comprising the pilot valve assembly. In the arrangement 150 of FIG. 6, three pilot valves 10 are used; however, the number of pilot valves could be two, three, four or more depending on the application. In the arrangement of FIG. 6, the joysticks 12 are restrained to move only fore and aft as is seen in FIGS. 1–4.

Referring now to FIGS. 7 and 8, there is shown another embodiment of the invention wherein a pilot valve assembly 160 utilizes a single joystick 162 to operate four work ports 163, 164, 165 and 166 by using four valve members similar to the valve members 26 and 28 of FIGS. 1–4. This is accomplished by using a ball mounted cam 168 fixed to the joystick 12. The ball mounted cam 168 has a cross-section similar to the cam 106 of FIGS. 1–4 and has a first cam surface similar to the first cam surface 102 and a second cam surface similar to the second cam surface 110 of FIGS. 1–4. Consequently, upon moving the joystick 12 about 360° of rotation, the ball mounted cam 168 can power, detent or release two of the four work ports 163–166 simultaneously by pushing heads 170, 171, 172 or 173 of four operating plungers which are similar to the operating plungers 90 and 92 of FIGS. 1–4.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a joystick operated hydraulic valve having a casing with at least first and second work ports; at least first and second valve members disposed to open and close the respective first and second work ports, and at least first and second operating plungers each having outer ends and being biased to a neutral position within the casing, the first and second operating plungers being engageable with the first and second valve members; at least one joystick pivotally mounted on the casing and operably engaging end surfaces of the outer ends of the operating plungers to allow pivotal movement of the joystick in one direction to cause one of the operating plungers to move inwardly toward from a neutral position a depressed position to stroke the respective valve, while the other operating plunger remains in the neutral position; the improvement comprising:

at least first and second detents within the casing for latching against axial movement the first and second plungers, respectively; each of the detents having first components which are stationary with respect to the first and second plungers and second components which are fixed to the first and second plungers, the second components being disposed between the outer ends of the plungers and the first components and acting to hold the respective operating plunger depressed and the valve members stroked;

first cam surfaces on the joystick for engaging the end surfaces of the outer ends of the first and second plungers, the first cam surfaces depressing the first plunger to stroke the first valve member upon pivoting the joystick in a first direction and depressing the second plunger to stroke the second valve member upon pivoting the joystick in a second direction; and second cam surfaces on the joystick for engaging the outer ends of the plungers when the plungers are depressed to pull the plungers and disengage the first and second components of the detents from one another so as to unstroke the valves.

2. The improvement of claim 1, wherein the first and second detents are magnetic.

3. The improvement of claim 2, wherein the first components of the detents are electromagnets and the second components of the detents are armatures.

4. The improvement of claim 3, wherein there is a single first return spring for biasing each operating plunger to the neutral position, the first return spring being a coil spring disposed between the casing and a coupling for holding that operating plunger.

5. The improvement of claim 4, wherein each coupling couples the valve member to its respective operating plunger with a lost motion connection and wherein a second coil spring is disposed between each coupling and its respective valve member for urging the valve member axially away from the coupling wherein when the operating plunger is moved toward the depressed position, the second coil spring urges the valve member to the stroked position.

6. The improvement of claim 1, wherein there is a single first return spring for biasing each operating plunger to the neutral position, the first return spring being a coil spring disposed between the casing and a coupling for holding that operating plunger.

7. The improvement of claim 6, wherein each coupling couples the valve member to its respective operating plunger with a lost motion connection and wherein a second coil spring is disposed between each coupling and its respective valve member for urging the valve member axially away from the coupling, wherein when the operating plunger is moved toward the depressed position, the second coil spring urges the valve member to the stroked position.

8. The improvement of claim 1, wherein the second cam surfaces are opposed and in spaced relation with respect to the first cam surfaces and wherein the first cam surfaces extend laterally past the second cam surfaces.

9. The improvement of claim 8, wherein the outer ends of the operating plungers are urged into engagement with the first cam surfaces to retain the joystick in the neutral position.

10. The improvement of claim 9, wherein the operating plungers are restrained for movement beyond the neutral position whereby the plunger remaining in the neutral position when the other plunger is depressed is spaced from the first cam surface of the cam on the joystick.

11. The improvement of claim 1, wherein there is a single joystick and more than two work ports, respective valve members and respective operating plungers and wherein the first and second cam surfaces are on a single cam member moveable by the joystick to stroke and unstroke the plungers.

12. The improvement of claim 1, wherein there are four work ports, four respective valve members and four respective operating plungers spaced 90° with respect to one another.

13. The improvement of claim 1, wherein there are only two valve members and two respective operating plungers operated by a single joystick.

14. The improvement of claim 1, wherein there is more than one joystick with at least two associated work ports, two associated valve members and two associated operating plungers stacked in side-by-side relation to form the joystick operated valve.

15. The improvement of claim 1, wherein the outer ends of the plungers each have enlarged heads providing other surfaces facing away from the end surfaces engageable by the second cam surfaces when the plungers are depressed to lift the plungers when the joystick is moved to unstroke the valves.

16. The improvement of claim 15, wherein the first components of the detents are electromagnets and the second components of the detents are armatures.

17. The improvement of claim 15, wherein the second cam surfaces are opposed in spaced relation with respect to the first cam surfaces and wherein the first cam surfaces extend laterally past the second cam surfaces.

18. The improvement of claim 5, wherein the outer end plungers each have enlarged heads providing other surfaces facing away from end surfaces, the other surfaces being engageable by the second cam surfaces when the plungers are depressed to lift the plungers when the joystick is moved to unstroke the valves.

19. The improvement of claim 18, wherein the second cam surfaces are opposed and in spaced relation with respect to the first cam surfaces and wherein the first cam surfaces extend laterally past the second cam surfaces.

* * * * *